March 19, 1957 — D. F. DROW — 2,785,874

GAS VALVE

Filed Feb. 25, 1954

INVENTOR.
Donald F. Drow
BY Manfred M. Warren
His Attorney

United States Patent Office 2,785,874
Patented Mar. 19, 1957

2,785,874

GAS VALVE

Donald F. Drow, Los Angeles, Calif., assignor to The Deutsch Company, a corporation of California Application February 25, 1954, Serial No. 412,469

3 Claims. (Cl. 251—184)

The invention relates to gas valves and more particularly to the rotary plug cock type as commonly used to provide manually controlled shut-off valves in the fuel supply line to gas burning appliances.

As will be understood, valves of the character described are usually of the plug cock type wherein a conical valve plug or rotor is fitted for rotation in a conical valve chamber and controls upon appropriate rotation the gas flow through the chamber. Valves of this type, while having many advantages and providing a simple effective valve construction, have a disadvantage in failing to provide a seal upon wear of the engaged conical faces of the rotor and valve chamber. To overcome this defect, spring takeup of the rotor is widely used so as to maintain a constant pressure of contact of the tapered rotor wall against the tapered chamber wall. Such an arrangement, however, by its very nature, permits axial displacement of the rotor and consequently, if some part of the rotor or attachment thereto is accidentally engaged and displaced, the rotor may be disengaged from the chamber wall with attendant leakage of gas. Due to this possibility, valves utilizing a spring takeup construction of the character described are prohibited in certain city codes.

An object of the present invention is to provide a gas valve of the character above which utilizes a form of spring takeup on the rotor so as to constantly maintain a satisfactory pressure upon the sealing surfaces of the valve to provide a good seal while at the same time providing means for positively preventing accidental axial displacement of the rotor.

Another object of the present invention is to provide a gas valve of the character described wherein the aforementioned features are accomplished simply and with a minimum number of parts, which provide for full adjustment as may be required throughout the life of the valve, so that long and satisfactory operation is assured.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
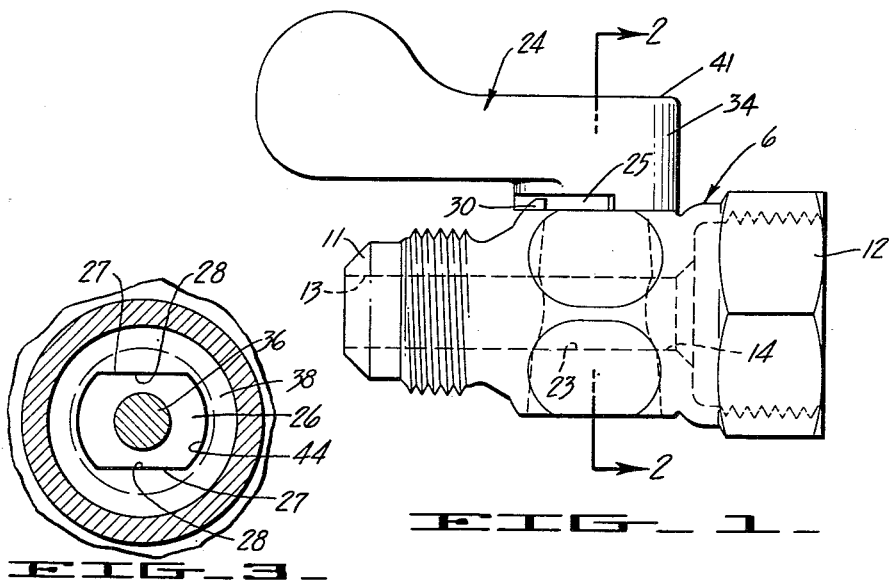
Figure 1 is a side elevation on a somewhat enlarged scale of a gas valve constructed in accordance with the present invention.

The gas valve of the present invention and as illustrated in the accompanying drawing includes a valve body 6 which is formed with a valve chamber extending transversely therethrough and defined by a conical wall 7, which extends between opposite sides 8 and 9 of the body. Tubular extensions 11 and 12 of the body provide inlet and discharge passages 13 and 14 which extend to and open through the chamber wall 7 and are arranged for communication with conduits not shown which may be connected to the extensions 11 and 12. Fitted within the chamber for sealed rotation is a valve rotor 16 having a conical wall 17 formed to mate with and rotate upon the chamber wall 7, the valve rotor being inserted into the chamber through the larger diameter end 18 thereof so that the larger diameter end 19 of the rotor will be positioned adjacent the larger diameter end 18 of the chamber and the smaller diameter end 21 of the rotor will be positioned adjacent the smaller diameter end 22 of the chamber. The rotor is formed with a bore 23 extending transversely therethrough for registration with the inlet and discharge passages 13 and 14 upon rotation of the plug to register the bore 23 therewith, the arrangement being such that rotation of the plug away from this indicated position will remove the bore 23 from its registration with passages 13 and 14 and effect a sealing of the valve.

Figure 3:
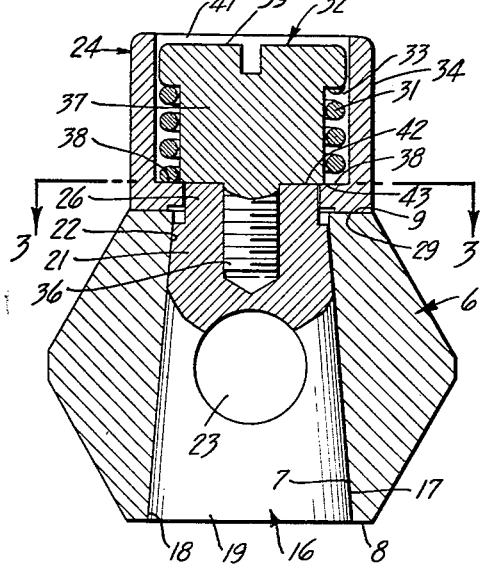
Figure 3 is a fragmentary cross-sectional view taken substantially on the plane of line 3—3 of Figure 2.

Rotation of the valve rotor to operate, regulate or close the flow of fuel through the valve, is effected by a handle 24, which is operatively mounted upon an axial extension 26 of the rotor which projects from the small diameter end 21 thereof to the outside of the valve body beyond the side 9. In accordance with the present construction, see Figure 3, the extension 26 is provided with one or more flats 27 or other noncircular cross-sectional form so as to engage similar flats 28 on the handle for locking the rotor and handle for joint rotation while at the same time providing relative axial sliding movement between the handle and the extension. In this manner one side 29 of the handle may be mounted and supported upon the side 9 of the body while permitting axial displacement of the rotor in the direction of the smaller diameter end thereof to apply desired sealing pressure on the engaged conical surfaces 7 and 17 of the body and rotor. For this purpose the base side 29 of the handle and the engaged side 9 of the body are formed flat and in planes perpendicular to the common axis of the rotor and valve chamber. A recess 25 formed in the base side 29 of the handle and receiving therein a raised boss 30 on the engaged side 9 of the body provides a convenient means for limiting the rotation of the handle through approximately ninety degrees, corresponding to displacement of the rotor between its full open and full closed positions.

As a further feature of the present construction resilient means, wherein the form of a helical spring 31, is connected between the rotor and body for constantly urging the sealing surfaces into engagement, and as a particularly important feature of the present construction additionally constantly urging the handle firmly against the body side 9. In this manner the interengaged tapered forms of the rotor and chamber wall support the rotor against axial displacement in the direction of the smaller end while the mounting and support of the handle on the body surface 9 prevents displacement in the opposite axial direction. Thus, while the spring means 31 is effective to constantly urge the rotor to its seated position, no accidental striking or movement of a body against the handle or other exposed part of the valve can cause relative displacement of the rotor in an unseating direction.

Mounting of the screw means as well as provision for manual adjustment is effected by a screw member 32 here mounted within a chamber 33 provided in a hub portion 34 of the handle, the screw member having a stem 36 threaded into the rotor extension 26 and an enlarged head 37 spaced outwardly from the base side 38 of the chamber so as to provide a seat for one end of the spring 31 compressed between the head 37 and the base side 38. By reason of this construction, it will be seen that the spring 31 will constantly urge the relative outward displacement of the rotor so as to maintain an effective seal and at the same time constantly press the base side 29 of the handle against the valve body so as to automatically take up for any wear which may occur between the engaged sealing surfaces. Preferably, and as here shown, the outer end 39 of the screw member is confined within the chamber 33, that is, spaced inwardly from the adjacent outer end 41 of the handle, so that any object accidently moved against the end of the handle will not normally engage the screw member but only the handle which is, as above noted, immovably supported against the outer surface 9 of the valve body.

In order to safeguard against leakage which might occur upon direct accidental engagement of the screw member, it is within the chamber, and to afford all of the safety advantages of mechanically locking the rotor against axial displacement in an unseating direction, provision is made for preventing relative movement between the screw member 32 and the handle, the latter being supported against axial movement, as above described. This is here accomplished by terminating the outer end 42 of the rotor extension 26 flush with the base side 38 of the chamber 33 formed in the handle and forming on the screw member 32 a shoulder 43 which may be screwed home upon the co-planar end 42 and side 38. In this position the screw member is supported by the handle against axial displacement and the whole assembly mechanically locked up against axial movement in a valve unseating direction, as required by various city codes. At the same time the resilient means 31 is utilized to nevertheless constantly exert a sealing pressure onto the engaged sealing surfaces of the rotor and chamber wall to provide a good and constant seal and to automatically take up for any wear which may occur.

In the assembly of the valve, the rotor is first fitted into the valve chamber by appropriate lapping operations and greased to provide a desired seal between the engaged surfaces. The bore portion 44 of the handle extending from the base side 38 of the chamber and the outer side 29 of the handle may then be mounted over the axial extension 26 to position the handle against the side of the body. With the handle so positioned, the outer end 42 of the extension may be machined off, as by means of a spot facing tool, flush with the base side 38 of the chamber. The screw member 32 and spring 31 may then be added to complete the assembly and the screw run down to engage the shoulder 43 against the coplanar flush side 38 and end 42.

Figures 2, 4:
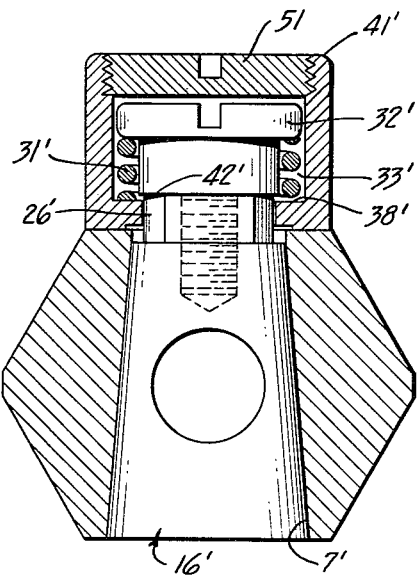
Figure 2 is a cross-sectional view on a further enlarged scale taken substantially upon the plane of line 2—2 of Figure 1.
Figure 4 is a cross-sectional view similar to Figure 2 but showing a modified form of the invention.

A modified form of the invention is illustrated in Figure 4 of the drawing wherein accidental striking or engagement of the screw member 32' by an object moved against the valve is prevented by the simple expedient of closing off the outer end 41' of the chamber 33'. This is here effected by threading a closure plug 51 into the outer end 41' of the handle chamber so as to cap the outer side of the chamber and prevent accidental engagement with the screw member 32'. In this construction it is not necessary to machine off the outer end 42' of the rotor extension 26' flush with the base side 38' of the chamber 33' as in the first embodiment, since no possible accidental engagement with the screw member is permitted. In this form of the invention the rotor 16' is constantly urged into sealing engagement with the conical wall 7' of the valve chamber by the spring 31' and the mounting and support of the handle against the side of the valve housing prevents any accidental engagement or displacement of the rotor or any attached part thereof as would cause an opposite axial movement of the rotor in an unseating direction.

I claim:

1. A gas valve comprising, a valve body having a valve chamber defined by a conical wall arranged with the smaller diameter end thereof opening to a side of said body and being formed with inlet and discharge passages opening to said chamber, a valve rotor having a conical wall formed to mate with and rotate upon said chamber wall and provided at its smaller diameter end with an axial extension projecting from said body side, a handle having a side mounted and supported upon said body side and having an opposite side and a bore extending between said handle sides arranged to slidably receive said extension, said handle bore and extension being fitted for joint rotation while permitting axial displacement of said extension in said bore, the outer end of said extension terminating flush with said last named handle side, a screw having a stem threaded into said rotor extension and a shoulder engaged with said flush end and side of said extension and handle and an enlarged head spaced from said flush side, and a spring mounted in compression between said flush side and head.

2. A gas valve comprising, a valve body having a valve chamber defined by a conical wall arranged with the smaller diameter end thereof opening to a side of said body and being formed with inlet and discharge passages opening to said chamber, a valve rotor having a conical wall formed to mate with and rotate upon said chamber wall and provided at its smaller diameter end with an axial extension projecting from said body side, a handle formed with axially aligned and relatively enlarged and reduced chamber and bore portions, said bore portion extending between a base side of said chamber portion and an inner side of said handle and being arranged to slidably receive said extension with said handle side mounted and supported upon said body side, said bore portion and extension being fitted for joint rotation while permitting relative displacement of said handle and extension axially of said extension, the outer end of said extension terminating flush with the base side of said chamber portion, a screw mounted in said chamber portion and having a stem threaded into said rotor extension and a shoulder engaged with said flush end and side of said extension and handle and an enlarged head spaced from said base side of said chamber portion, and a helical spring mounted in compression between said head and base side.

3. A gas valve comprising, a valve body having a valve chamber defined by a conical wall arranged with the smaller diameter end thereof opening to a side of said body, a valve rotor having a conical wall mating with and mounted for rotation upon said chamber wall and provided at its smaller diameter end with an axial extension projecting from said body side, a handle mounted for axial reciprocation on said extension and for joint rotation therewith while permitting said reciprocation, resilient means connected between said extension and handle and constantly urging said handle against said body side and constantly urging said rotor axially in the direction of said smaller diameter end thereof, and means engageable with said extension and handle and including rigid face-to-face abutments and cooperating with the support of said handle on said body side to lock said rotor against displacement in an opposite axial direction toward its larger diameter end.

References Cited in the file of this patent

UNITED STATES PATENTS

| 862,985 | Minter | Aug. 13, 1907 |
| 1,176,253 | Schutt | Mar. 21, 1916 |
| 1,434,832 | Long | Nov. 7, 1922 |
| 1,492,883 | Kidder | May 6, 1924 |
| 1,784,636 | Leins | Dec. 9, 1930 |
| 1,842,211 | Slayton | Jan. 19, 1932 |

FOREIGN PATENTS

| 553,230 | Germany | June 23, 1932 |
| 635,958 | Great Britain | of 1950 |